United States Patent [19]

Skreien

[11] 3,909,242
[45] Sept. 30, 1975

[54] METHOD FOR DETERMINING OPERATING CONDITIONS IN ELECTRICAL FURNACES

[75] Inventor: Nils Skreien, Skedsmokorset, Norway

[73] Assignee: Elkem Spigerverket A/S, Oslo, Norway

[22] Filed: Oct. 4, 1973

[21] Appl. No.: 403,638

[30] Foreign Application Priority Data
Oct. 9, 1972 Norway................................ 3606/72

[52] U.S. Cl............................................ 75/10; 13/13
[51] Int. Cl.² ...................... C22B 4/00; H05B 7/18
[58] Field of Search............................... 13/9, 12–14; 75/60

[56] References Cited
UNITED STATES PATENTS
3,749,804  7/1973  Thomas ................................. 13/13
3,767,832  10/1973  Bennett.................................. 13/13

*Primary Examiner*—Peter D. Rosenberg
*Attorney, Agent, or Firm*—Eyre, Mann & Lucas

[57] ABSTRACT

A method for determining the operating conditions in electrical arc furnaces by measurement of an electrical parameter which is varied by the metallurgical processes being carried out. This method may be utilized either with furnaces which operate with an open electrical arc above a molten bath or with furnaces which operate with submerged electrodes. The measured electrical parameter is processed to form a signal for controlling the temperature in the furnace, or the supply of raw materials to the furnace, and/or the carbon/oxide ratio in the raw material mixture in the furnace.

6 Claims, 1 Drawing Figure

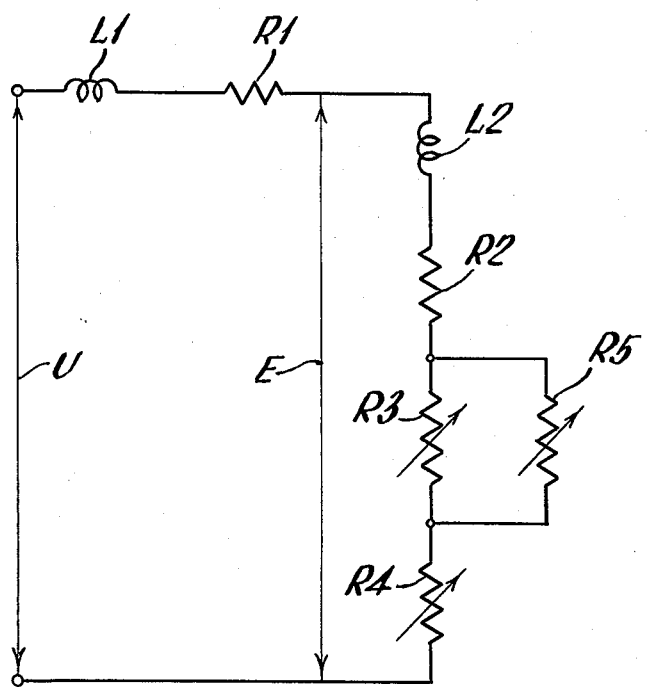

METHOD FOR DETERMINING OPERATING CONDITIONS IN ELECTRICAL FURNACES

BACKGROUND OF THE INVENTION

Several electrometallurgical processes are carried out by a combination of arc and resistance heating in the operation of a typical electrical furnace. Examples of such processes are the smelting and refining of oxide and sulfide slags, and electrothermal reduction processes. The difficulty in carrying out direct, continuous monitoring of the conditions in the smelting furnace during these processes has posed a long-standing problem in the metal refining industry. This difficulty is heightened when the electrodes are submerged in a solid charge. Thus, there has existed for some time a strong need for a way to carry out measurements which provide information about the electrometallurgical processes in a smelting furnace and which may be employed in controlling these processes.

SUMMARY OF THE INVENTION

The present invention comprises a method of determining the metallurgical conditions in an electrical furnace by direct and preferably continuous measurement of an electrical parameter, such as a voltage, for instance the voltage from electrode holder to furnace bottom, which is varied in accordance with the non-linear characteristic of the electrical arc struck in carrying out the metallurgical processes. The electrical parameter thus measured is processed to form a single indicative of the degree of deviation of the voltage waveform between the electrode and the furnace bottom from the waveform of the supplied or grid voltage.

BRIEF DESCRIPTION OF THE DRAWING

The present invention may be better understood by reference to the accompanying drawing, which is a diagram of an equivalent circuit representative of an electrical system including only one electrode in an electrical smelting furnace which may have one or more electrodes.

DESCRIPTION OF THE PREFERRED EMBODIMENT

Referring now specifically to the drawing, the meanings of the various symbols employed therein are as follows:

U - Voltage supplied from the electrical grid
L1 - Total inductance in grid and bus bars
L2 - Total inductance in electrode and arc
R1 - Total internal resistance in grid and bus bars
R2 - Resistance in electrode
R3 - Resistance in arc
R4 - Resistance formed by the charge comprising the molten bath and the solid raw material mixture in the furnace.
R5 - Resistance between electrode and charge
E - Voltage between electrode holder and furnace bottom In those furnaces in which the electrodes are submerged in the charge, I have found that the resistance R5 will be relatively low as compared to open electrical arc furnaces, and will therefore shunt the arc resistance to a substantial degree. Inductances L1 and L2 and resistances R1, R2, R4 and R5 may be considered as essentially linear elements, while the arc resistance R3 is non-linear. I have also found that the instantaneous value of arc resistance R3 is a function of temperature, pressure, the chemical composition of raw materials forming the charge, the chemical composition of gases generated during the metallurgical processes, the geometry in the arc zone. The resistances R4 and R5 will also vary somewhat in response to these same conditions. The non-linear arc resistance R3 may cause some degree of rectification of the alternating current, and will always cause the current waveform to deviate from the waveform of the supply voltage. The reactive components of the circuit will contribute to the distortion of the voltages in the circuit, for instance of the voltage E between each electrode holder and the furnace bottom. For these reasons, there will be developed certain harmonics of the base frequency of voltage E, which corresponds to the frequency of the applied sinusoidal alternating voltage U. The higher-frequency harmonics will, for a given furnace and given operating conditions, be chiefly determined by the relative magnitudes of the non-linear arc resistance R3, charge or bath resistance R4, and the parallel electrode-to-charge resistance R5. The distortion of the waveform of the electrode holder-to-furnace bottom voltage E as compared to the supplied or grid voltage U is thus indicative to those operating conditions which influence the values of R3, R4 and R5. Therefore, by measuring the voltage E and subjecting this measured voltage to suitable filtration to select one or more high-frequency harmonics, a signal is produced which indicates the degree of deviation of the voltage E from the voltage U supplied from the electrical grid. The signal thus derived can be employed to control the electrometallurgical processes either by governing the supply of raw materials to the furnace, or by governing the carbon/oxide ratio (carbon coverage) by the reduction processes within the furnace, or by governing the temperature within the furnace. Control of these and other parameters in response to the derived signal may be carried out either automatically or manually. The derived signal may be recorded continuously or intermittently by a variety of known means to provide a history of furnace operations.

As a practical example in smelting an oxide slag in a 2700 kVA, three-phase arc-type steel furnace, variations from 1 to 5 in the normalized magnitude of the derived signal have been recorded by filtration and rectification of the harmonic components of the voltage E between electrode holder and molten bath. When the molten bath becomes cold due to the excessive supply of raw materials to the furnace, the degree of distortion of the waveform of voltage E as compared to the waveform of voltage U will be reduced. In contradistinction, a high-temperature oxide melt will product increased distortion. These differences are theoretically due to the strong dependence of the electrical resistance R4 of the oxide melt upon temperature, with the ratio between R3 and R4 being altered as temperature varies. With a hot molten bath, the chief component of the voltage drop in the circuit will be the arc itself, while a colder molten bath will cause an increasing voltage drop across bath resistance R4.

Recording of the measured, filtered and rectified voltage between the electrode holders and the furnace bottom in larger three-phase furnaces for production of ferro-silicon alloy has shown that the distortion of the waveform of voltage E will vary according to the previously enumerated operating conditions in the furnace, especially the carbon/oxide ratio in the raw material mixture, i.e., carbon coverage. Variations in the carbon coverage of ± 5 percent in relation to the normal or desired value of carbon coverage can produce signal variations on the order of ± 30 percent. Increased carbon coverage will product less distortion in the waveform of voltlage E. The theoretical explanation of this phenomenon is that the increasing carbon coverage will result in higher temperature in the smelting crater, possibly exceeding 2000°C. Due to this higher temperature in the gaseous atmosphere around each electrode tip, the arc impedance will be more linear than at lower temperatures owing to the conductivity of the plasma, and the distortion of the waveform of voltage E will be decreased. An increasing degree of shunting of the arc through the parallel electrode-to-charge resistance R5 will also result from increased carbon coverage, and will cause greater linearity of the net resistance in the furnace, thereby decreasing the distortion.

The advantages of the present invention, as well as certain changes and modifications of the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

What is claimed is:

1. A method for determining the metallurgical conditions in an electrical furnace having at least one electrode, said method comprising the steps of:

measuring an electrical parameter which is non-linearly varied by conditions within the electrical furnaces caused by the metallurgical processes being effected;

processing at least one harmonic of the measured electrical parameter to derive a signal for use in controlling the metallurgical processes; and controlling the metallurgical processes in response to the derived signal.

2. The method according to claim 1 wherein the measuring step comprises measuring at least one electrode holder-to-furnace bottom voltage, and the processing step comprising filtering at least one harmonic in said at least one electrode holder-to-furnace bottom voltage to ascertain the degree of deviation in waveform of said at least one electrode holder-to-furnace bottom voltage from the waveform of the applied or grid voltage.

3. The method according to claim 1 wherein the controlling step comprises controlling the supply of raw material mixture to the furnace in response to the derived signal.

4. The method according to claim 1 wherein the controlling step comprises controlling the temperature in the molten bath in response to the derived signal.

5. The method according to claim 1 wherein the controlling step comprises controlling the carbon/oxide ratio in the raw material mixture in the furnace in response to the derived signal.

6. The method according to claim 1 comprising the further step of recording the derived signal to provide a history of furnace operations.

* * * * *